July 22, 1952  R. CHELMINSKI  2,604,078
SEDIMENTATION APPARATUS AND DRIVE
Filed Feb. 16, 1946  5 Sheets-Sheet 3

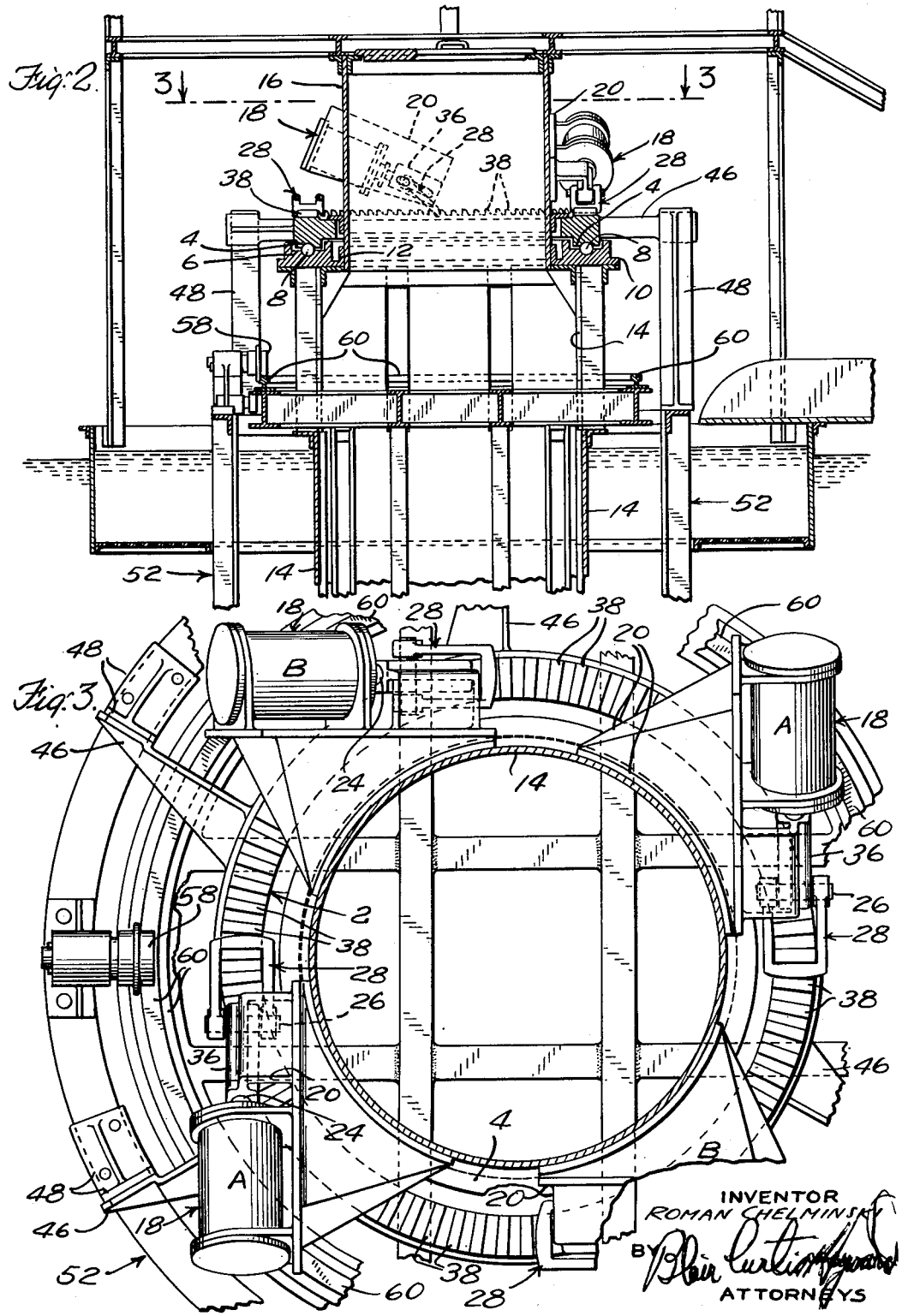

INVENTOR
ROMAN CHELMINSKI
BY
ATTORNEYS

July 22, 1952

R. CHELMINSKI 2,604,078

SEDIMENTATION APPARATUS AND DRIVE

Filed Feb. 16, 1946

INVENTOR
ROMAN CHELMINSKI
BY
ATTORNEYS

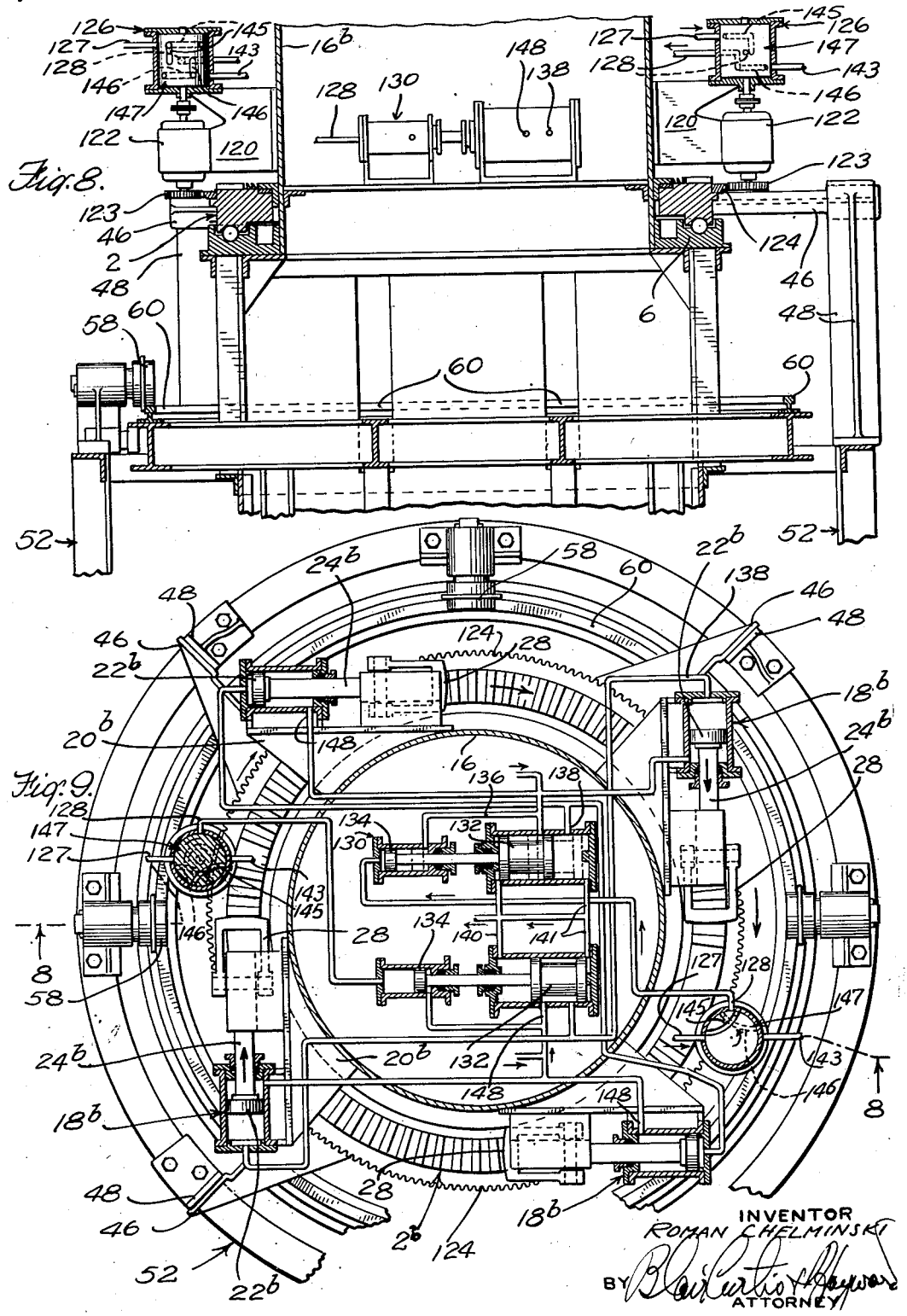

Patented July 22, 1952

2,604,078

UNITED STATES PATENT OFFICE 2,604,078

SEDIMENTATION APPARATUS AND DRIVE

Roman Chelminski, Wilton, Conn., assignor to General American Transportation Corporation, Chicago, Ill., a corporation of New York Application February 16, 1946, Serial No. 648,157

2 Claims. (Cl. 121—117)

This invention relates to a driving mechanism for thickeners and other heavy slowly rotating apparatus to which considerable torque must be applied to effect its turning at the relatively low speed.

An example of the type of mechanisms to which the present invention is particularly applicable is the raking or scraping arms of a thickener or sedimentation tank, such as that shown, for example, in the copending application Serial No. 588,278, filed April 14, 1945, now Patent No. 2,553,958 issued May 22, 1951. In apparatus as there shown the driving mechanism for effecting the rotation of the drum or cage to which the rake or scraper carrying arms are attached is located on a pier at the center of the settling tank and the driving is effected by reduction gear connections from an electric motor to a large ring gear concentric with the drum or cage. Because of the comparatively large diameter of the tanks of such thickeners and therefore the comparatively great length of the arms, high reduction ratios from the motor speed to the speed of rotation of the raking arms are required and special means must be used to equalize the load through several gear trains, or excessively large tooth loads are encountered. In thickeners, for example, in which the tank diameter is 200 feet or more speed reductions of 100,000 to 1 are not uncommon, and torque often is as high as 750,000 foot pounds.

It is obvious that reductions in speed of this magnitude require elaborate gearing, which is expensive and which occupies considerable space. When a reduction of this magnitude is applied to mechanism such as is employed to drive the scraper or rake-carrying arms of a thickener of the size above mentioned the space which the reducing gearing occupies upon the central supporting pier leaves little room for the provision of a manhole or other means for obtaining access to other mechanism within the pier.

Even when driving through equalized gearing from at least two diametrically opposed points, 12-inch face gears are often necessary to withstand the stresses on the gear teeth. Not only is it necessary to distribute the driving load so that it is applied in a balanced relation to the axis of the bull gear, but it is also necessary that the loads on the teeth of the two driving pinions or other driving means be perfectly equalized.

With the foregoing difficulties in mind, the present invention aims to provide improved means for imparting rotary movement, under some or all of the circumstances above recited, to relatively large annular driving gears or bull wheels such as those employed on thickeners, which means will permit the elimination of substantially all gear trains and which will provide automatically for distribution of tooth pressures and balanced application of the turning force about the axis of the gear or wheel.

More particularly the invention aims to provide power transmitting means for the foregoing and similar purposes which not only avoids, substantially entirely, the necessity for speed reduction gearing, but also avoids the necessity for differential gearing.

With the foregoing and other objects in view, the invention uses fluid operated pawls arranged to operate upon a ratchet ring gear in such timed relation to each other and with such balanced pressures, having regard to their positions about the axis of the gear and any differences in mechanical advantage, that, not only will they effect continuous slow turning of the ratchet wheel or gear, but the application of the turning torque will be balanced with respect to the axis of the gear. According to the invention, the fluid pressure may be so applied to the driving means that the driving forces exerted upon the ratchet wheel or gear are equalized through the fluid.

Other objects and important features of the invention, to which reference has not specifically been made hereinabove, will appear from the following specification and claims considered in connection with the accompanying drawings.

In this specification and the accompanying drawings I have shown and described a preferred embodiment of my invention and various modifications thereof; but it is to be understood that these are not intended to be exhaustive nor limiting of the invention but, on the contrary, are given for purposes of illustration in order that others skilled in the art may fully understand the invention and the principles thereof and the manner of applying it in practical use so that they may modify and adapt it in various forms, each as may be best suited to the conditions of a particular use.

In the drawings:

Figure 2 is an enlarged vertical section, the upper portion of the pier showing details of the driving mechanism;

Figure 3 is a horizontal section on the line 3—3 of Figure 2;

Figure 6:
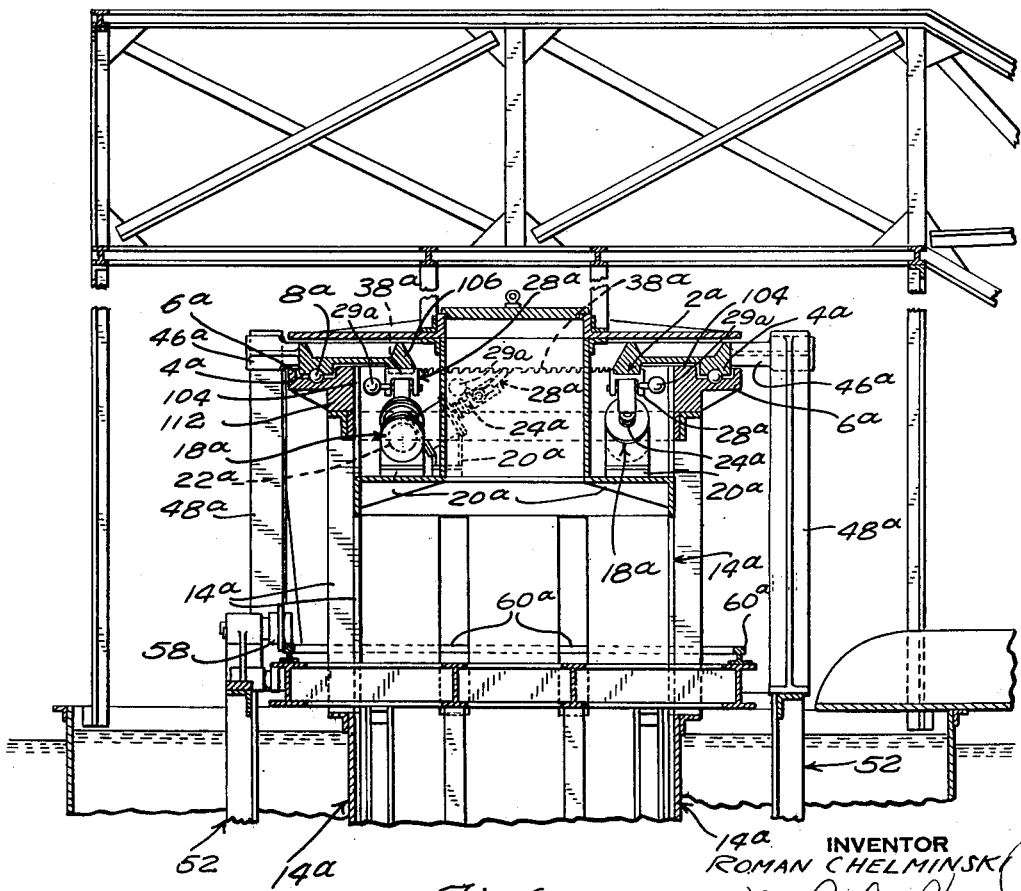
Figure 6 is a partial sectional view, similar to Figure 2, through a modified embodiment of the invention in which the pawl-operating cylinders are located inside the pier upon which the arm-carrying cage or drum is mounted, instead of upon the outside as shown in Figure 2, and in which the pawls act upon a downwardly facing ratchet gear.
Figure 7:
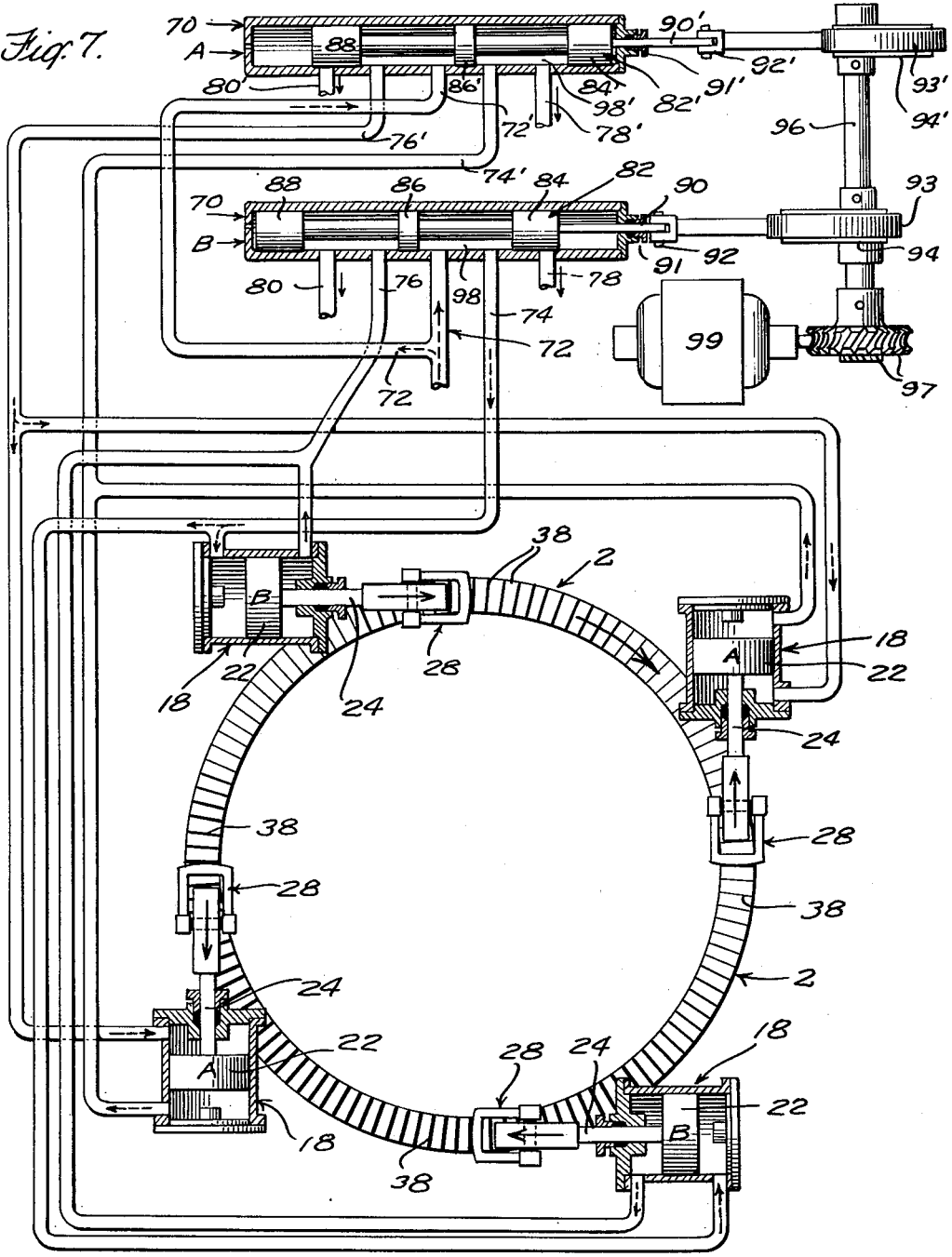

Figure 7 is a diagrammatic view, showing a control valve partly in section, and the timing mechanism designed to regulate the speed of operation of the ratchet gear drive and the cylinders 18, all diagrammatically arranged to show the fluid circuits; and Figure 8 is a fragmentary view in vertical section similar to that of Figures 2 and 6, but with different driving cylinders and control valves embodying the invention. The section of this figure is indicated by line 8—8 on Figure 9.

Figure 9 is a diagrammatic view partly in section and partly in plan showing the motor and valve mechanism of Figure 8.

In the illustrative embodiment of the invention, the pier 14, the scraper-arm carrying frame 52, the track 60 and the flanged rollers or wheels 58 which travel on the track 60 and are connected to frame 52 to support it in rotatable relation to the pier 14 may be the same as shown in the copending application of Roman Chelminski, Otto R. Kuster and Dealy K. Hines, Serial No. 588,278, filed April 14, 1945. Likewise the frame 52 may have upstanding arms 48 arranged to be engaged by arms or spokes 46 of a central spider, of which the annular ratchet wheel or gear 2 of the present invention forms a part, this ratchet gear having a downwardly extended annular rib 4 travelling in an annular bearing bed 6 and supported in any suitable manner on anti-friction bearings 8. The bearing bed 6 may be formed as, or mounted upon, an annular casting 10 having an inner peripheral flange 12 surrounding a manhole. This casting is supported upon, and forms a part of the head of, the main pier 14.

A tubular body 16 secured on the flange 12 forms an upward extension of the pier 14, of reduced diameter, and also provides an access manhole to the interior of the pier 14. This body 16 is made of heavy steel to serve as a support for the driving mechanism, now to be described, for the ratchet wheel 2.

As shown in Figure 2 of the drawings, in the illustrative embodiment of the invention the driving mechanism for the ratchet gear 2 comprises fluid cylinders 18 supported on brackets 20 and arranged at equiangular spacings about the axis of the gear 2, e. g., four cylinders at intervals of 90°. It will be noted that the longitudinal axes of the cylinders 18 are inclined slightly to the plane of the ratchet gear 2 at angles sufficient to provide clearance for the cylinders 18 and brackets 20, etc.

Figure 1:
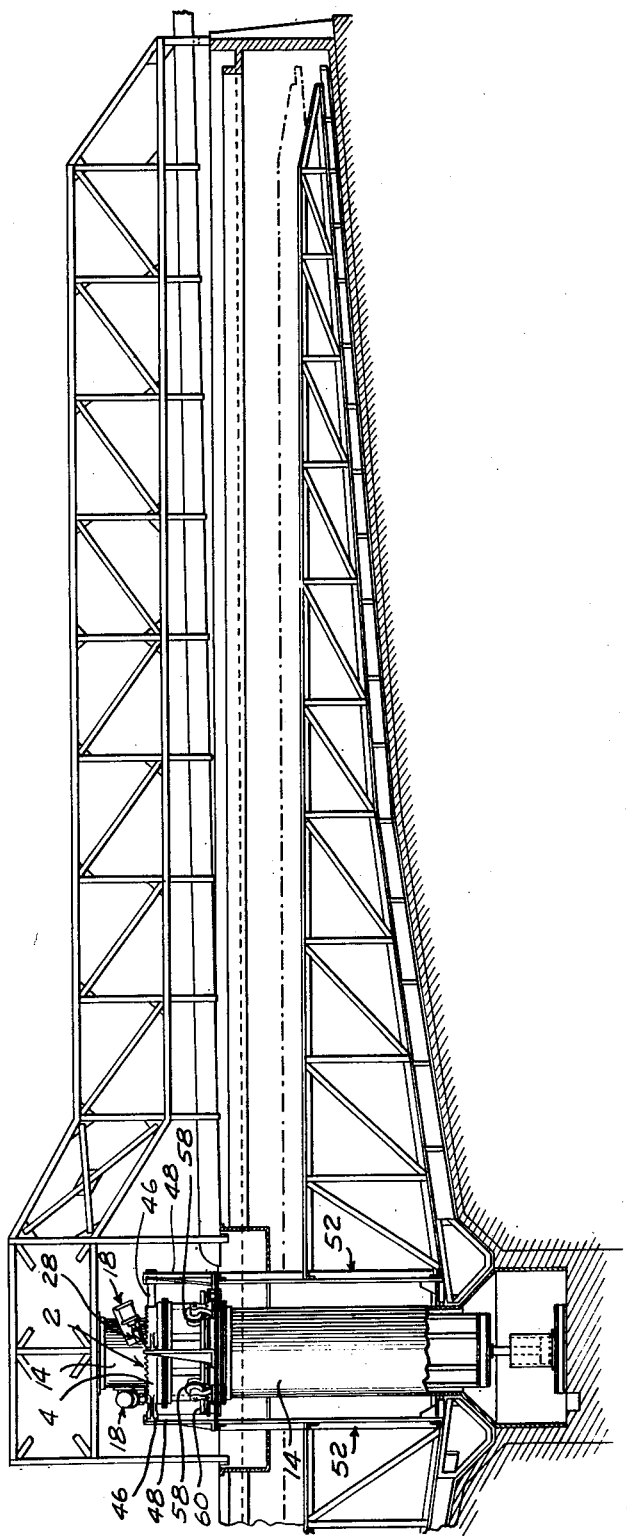
Figure 1 is a vertical section of one half of a sedimentation device or sewage thickener of the type used in sewage disposal plants, the left end of the rake or blade-carrying arms not being shown in full.
Figure 4:
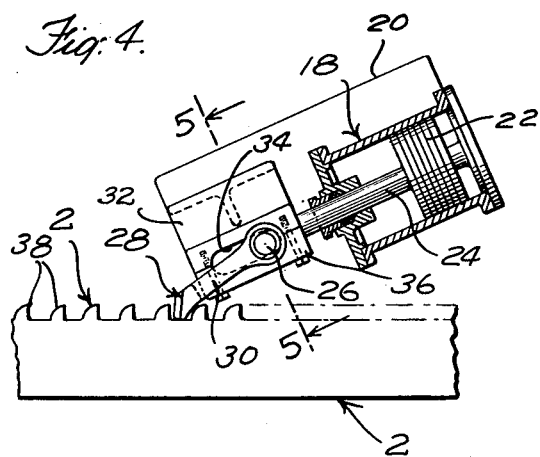
Figure 4 is an enlarged side section of one of the pawl-operating hydraulic or other fluid-operated cylinders and of the piston rod guide and connected pawl.
Figure 5:
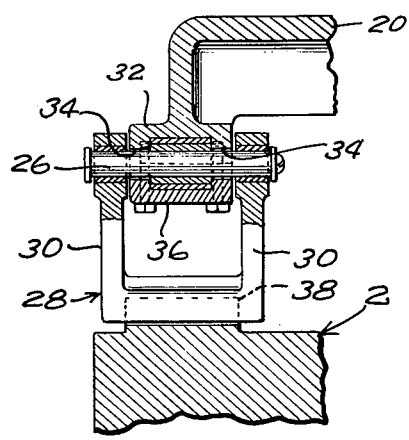
Figure 5 is an enlarged section on line 5—5 of Figure 4 of one of the piston rod guides and of the pawl connected to the piston rod.

Each of the cylinders 18 has therein a piston 22 (Figure 4) which is connected by a piston rod 24 to trunnions 26 on which is mounted the U-shaped pawl 28, the pawl 28 being shown as having two arms 30, each of which engages one of the trunnions 26. To avoid undue strain on the piston rod 24, both the rod 24 and the trunnions 26 slide in a guide track 36 in the bracket 32, mounted on the pier extension 16 in such manner that the piston rod and the trunnion guides have the same inclined relative axis of reciprocal movement to the plane of the ratchet gear 2 as the axes of the cylinders 18, respectively. The trunnions 26 extend through slots 34 in the sides of the guide 36.

It will be seen that the swinging of the pawl 28 upon the trunnions 26 permits the pawl 28 to ride idly over the ratchet teeth 38 of the ratchet gear 2 on the return stroke of the piston 22 and to drop into operative position again behind the vertical wall of one of the ratchet teeth 38 at the end of the return stroke. Thus on the next thrust stroke of the piston 22 it will engage the ratchet gear 2 through the pawl 28 and will advance it a distance of one or several ratchet teeth.

In order that the application of driving force to the ratchet gear 2 may be substantially balanced about the axis thereof and substantially continuous, there are preferably provided, as shown in Figure 2 of the drawings, a sufficient number of such pawls 28 and operating cylinders 18 to insure that at least two pawls symmetrically disposed about the axis of rotation will operate simultaneously, to turn the ratchet gear 2 while another symmetrically disposed group of similar pawls are being drawn back by the return strokes of their pistons 22. To insure balanced operation, the cylinders 18 of each group are arranged to operate pawls 28 simultaneously and under the same fluid pressure. Since the return stroke may be more rapid than the thrust stroke under load, the thrust of the two pairs of pistons may overlap in time of operation, i. e., one pair starts its thrust a little before the other pair completes its thrust and thus there is a substantially even flow of power and a steady speed of rotation. Such steadiness may be increased by use of a greater number of groups of balanced motors, each group operating at different times from the other groups.

To insure the desired sequence of operations and application of balanced forces to opposite sides of the ratchet gear 2 any suitable valve timing mechanism may be provided. In Figure 7 such a timing mechanism which operates so to control the input of the operating fluid into the respective ends of the cylinders 18 and its exhaust from the opposite ends that, when two diametrically opposed cylinders 18 are operating to advance the pawls 28 and turn the ratchet gear 2 the other two clyinders 18 will be retracting their pawls preparatory for a new thrust stroke to turn the ratchet gear 2 beginning at the end of the stroke of the first mentioned pair of pawls.

In this embodiment of the invention, there are four driving pawls 28 and four pawl-operating cylinders 18 having pistons 22 therein. As hereinabove suggested, it is important to insure the application of balanced driving torque to the ratchet gear 2; so that it is not pushed away from its axis but merely turned about it. To insure this there is one set of valves A arranged to control the input of the fluid pressure into both diametrically disposed cylinders 18 and the exhaust of the fluid therefrom and another set of valves B is arranged to control the input of the operating fluid into the other two cylinders 18 and its exhaust therefrom. Since the fluid from these valves is introduced into the two diametrically disposed cylinders from the same manifold, they will be under the same pressure at all times. Also the pressure of the operating fluid supplied through valve A will be the same as that supplied through valve B, so that the force applied by one group of cylinders is substantially the same as is applied by the other group.

As shown in Figure 7, two like valve castings 70 each have similar connections for controlling the input and exhaust of the pressure fluid to and from the respective sides of the pistons 22 in the cylinders 18. These connections, as shown in Figure 7 comprise an inlet pipe 72 from a pump or reservoir (not shown) of fluid under pressure. Any suitable fluid may be used, but ordinarily oil is most advantageous. Manifold pipes 74 and 76 serve to carry the fluid to, and to remove it from, the back ends and front ends, respectively, of the upper and lower cylinders 18, as placed on the diagram of Figure 7. Similar manifold pipes 74' and 76' carry the fluid to, and remove it from, the ends of the right and left cylinders 18 as placed on Figure 7. Pipes 78 and 80 lead from the valve casing 70 to an exhaust sump or low pressure reservoir. These pipes 72, 78 and 80 may be connected to any effective fluid pressure supply system and return, such as are commonly sold and used for various hydraulic motors and control systems.

As herein shown, each of the slide valves 82, 82' has valve enlargements 84, 86 and 88 thereon making substantially fluid tight fit with the casing 70, the stem portions between these valve enlargements permitting flow of fluid between the selected pipes opening into the casing 70 between adjacent enlargements 84, 86 or 88. As shown in Figure 7, when the valve 82 is in its extreme left hand position a connection is provided between the pipe 76, which is connected to the front end of the cylinder 18, and the pipe 80 leading to the exhaust sump. Thus liquid may be discharged from the cylinders 18 in front of the pistons 22 in the valve set B as they are moved forwardly in the ratchet gear-operating direction. This forward movement is accomplished by the introduction of the pressure liquid from the inlet line 72 through the chamber 98 around the stem portion of valve body 82 and thence through pipe 74 to the cylinders 18 where it enters behind the pistons 22 of the same valve set B. At this time any flow of liquid from the pipe 74 into the exhaust pipe 78 is shut off by the enlarged valve portion 84.

The valve 82 may be operated directly by a timing mechanism, e. g. from a synchronous electric motor 99 and appropriate gearing 97 and eccentric 93—94.

When the valve body 82' is at the right hand limit of its movement as shown we then have the following connections: The inlet pipe 72' is connected to the pipe 76', so that it introduces the pressure liquid into the cylinders 18 in front of the pistons 22 in the valve set A to cause the return stroke thereof. The exhaust pipe 80' is shut off by the valve portion 88 while the exhaust pipe 78' is connected to the pipe 74' to receive the liquid exhausted from beyond the pistons 22 of the same valve set A as they are driven to make their return strokes by the liquid introduced in front of them through connections 72' to the pipe 76'.

The control of the operation of the two valve mechanisms A and B shown in Figure 7, to insure the proper relative timing thereof, may be effected in any suitable manner. As herein shown, the upper valve mechanism A is arranged to control those cylinders 18 which are marked A on Figure 7, while the lower valve mechanism B is arranged to control the operation of those cylinders which are marked "B" on Figure 7 of the drawings. To insure operation of these valves in proper timed relation to each other the valve 82 is connected to a stem 90 passing through a stuffing box 91. The stem 90 is in turn connected by a clevis and pin connection 92 to an eccentric strap 93 surrounding an eccentric 94 on a shaft 96 having thereon a worm wheel 97 which may be driven by a worm (not shown) at any desired uniform speed, e. g., by a synchronous motor 99. A cam designed to give a long power stroke and quick return, with consequent overlapping of power strokes of cylinders A and B, may be used instead of eccentric 93. It will be evident that many cam forms can be used.

The valve 82' of the valve mechanism A is similarly connected to a rod 90' passing through a stuffing box 91'. The rod 90 is in turn connected by a yoke and pin connection 92' to the strap 93' on an eccentric 94' on the same shaft 96 as the eccentric 94 but turned 180° on the shaft 96 with respect to the eccentric 94. It will thus be seen that, as the shaft 96 is turned by the worm and worm gear drive connection, the valve mechanism A will control its two cylinders A (Figure 7) to operate their pawls to turn the ratchet gear 2 when the cylinders B under control of the valve mechanism B have completed their thrust stroke. The two groups of cylinders 18 thus alternate and there will thus be a substantially continuous and uninterrupted turning of the ratchet gear 2 at any desired low speed.

In a modified form of the invention shown in Figure 6, the annular ratchet gear, instead of being located upon the reduced extension 16 or the pier 14, is shown as located within the pier 14a. In Figure 6 the annular gear 2a is shown as having downwardly facing ratchet teeth 38a on an annular flange 106 overhanging the upper end 104 of the pier 14a. A depending rib 4a received a bearing ring 6a carried by brackets or a flange 112 on the upper end 104 of the pier 14a. Suitable antifriction bearings 8a may be provided in the ring 6a upon which the rib 4a rests.

In this form of the invention the cylinders 18a are carried upon inwardly extending brackets 20a on the inner wall of the pier 14a and the pawls 28a, operating from the pistons 22a by connections through the piston rods 24a similar to the connections between pawls 28 and piston rods 24 hereinabove described, are held in operative relation to the ratchet teeth 38a, against the tendency of gravity to move them away from the teeth 38a, by counter weights 29a.

The equiangular spacing of the cylinders 18a about the axis of the gear 2a and the timing of the operations of the various pawls 28a will be the same otherwise as it is in the form of the invention hereinabove described.

In the embodiment of the invention herein shown and described, the operation of the pawls 28 has been described as brought about by cylinders 18 having fluid-operated pistons therein which are fluid-operated in both directions. Although this is the more advantageous arrangement, and fluid-operation in the power applying direction is practically essential, it will be understood the return stroke of the piston is not confined to fluid operation, but may be, e. g., by means of a spring.

An alternative valve arrangement is shown in Figures 8 and 9. In Figure 8 the bull ring 2 rotates in the bearing 6 and drives the scraper frame 52 through the paddles 46 the same as in Figure 2. A bracket 120 secured to the side of the neck 16b carries a gear box 122 with lower pinion 123 meshing with a ring gear 124 secured to the bull ring 2 as shown. Above the gear box 122 and driven by it, is a rotary valve mechanism 126. This valve mechanism 126 consists of a cylindrical shell and rotor, the shell having a pressure inlet port 127 at an uppermost level, an exhaust port 143 at a lowermost level and, on an intermediate level, a connection 128 to an auxiliary valve 130 for the modified ratchet motors 18b. The rotor 147 has passages drilled through it to interconnect inlet 127 or the exhaust 143 with the port 128. The auxiliary valve motor 130 is connected to the port 128 in the rotary valve housing to operate its piston 134 connected to main valve slide 132.

The rotary valve 126 is provided, in addition to the auxiliary valve connection 128, with pressure inlet and exhaust ports 127 and 143. As shown in Figure 8, these are on levels respectively higher and lower than the auxiliary valve connection 128, the latter being connected to a port within the valve housing by which it may communicate with the ports 145 and 146 respectively (Figure 9) in the rotary valve core. The pressure inlet connection 127 is on the same level as the inlet end of port 145 in the valve core and the outlet of port 145 is on the level of the port 128, and therefore affords communication between the pressure inlet and the auxiliary valve connection 128 when the core is in the proper angular position just beyond that shown at the right in Figure 9. Port 146 has its outlet end on the same level as the exhaust port 143 and its inlet end on the level of port 128. It therefore makes connection between the auxiliary valve connection 128 and the exhaust port when the valve core is in the proper angular position, just before that shown at the left of Figure 9.

The chamber behind the small piston 134 is connected to a constant pressure inlet line 136 which may be at the same pressure as that supplied through the rotary valve 126 from port 143.

The valve motor 130 operates when this pressure is introduced through 128 into the end of the cylinder because of the greater area exposed on the end of the piston 134 as compared with the annular area around the piston rod on the opposite side of the piston. The area of the piston rod is at the exhaust pressure, since the opposite end of the main valve slide is always exposed to the exhaust line 141.

The line 138 connects this main valve with the ends of the ratchet motor cylinders 18b diametrically opposite positions on the bull ring 2.

The relation between the inlet and the outlet ports 136 and 138 is such that in the position shown they are separated by the valve slide 132, whereas when th slide is moved to the opposite end of the cylinder they are connected through the reduced diameter portion of the slide.

Exhaust ports 140 and 141 are provided to relieve the pressure between the slide valve and each end of its cylinder. These may be open to the atmosphere but preferably are provided with connections to an hydraulic reservoir in order to drain back any liquid which may leak back past the valve slide.

The piston rod 24b for piston 22b in the ratchet motor cylinder is shown relatively large so that only a small volume remains within the cylinder around the piston rod 24b to be filled by the fluid under pressure admitted through port 148 which, in this case, is constantly open to the fluid pressure source in the same manner as port 136 of the auxiliary valve. This large piston rod gives two advantages: first, because of the small volume displacement, it allows rapid return of the piston after one power stroke and before beginning the next. Secondly, because of the relatively small piston area exposed to the pressure, any hammering at the end of the return is substantially avoided, even though the same pressure fluid is used for the return as for the driving and; thirdly, it permits the constant exposure at 148 to the fluid pressure, the driving force, of course, being a function of the difference between the area on the end of the piston and the annular area exposed to the pressure on the opposite side of the piston.

When pressure is admitted through the port 138 in the auxiliary valve, the piston 22b will be driven forward and liquid expelled through the port 148 as the operation of the motor progresses. At the end of this stroke the auxiliary valve is reversed, so that port 138 is opened to the relief port 140, the pressure liquid escapes from the end of cylinder 18b and liquid under pressure enters through port 148 to drive the piston back and thereby retract the pawl for a new power stroke.

As the bull ring 2 is rotated, the pinion 123 is driven from ring gear 124 and the valve core 147 is rotated, with such gear ratio in the transmission 122 that during the forward stroke of the pawl the port 145 rotates from the position shown at the right in Figure 9 to a position in which the port 146 is aligned between the valve port 128 and exhaust port 143.

When this latter condition occurs, the valve operating cylinder 130 is connected through the port 128 and the port 146 to the relief port 143, whereupon the piston 134 is moved by the pressure from the port 136 exerted on the back of piston 134, and thereby the port 138 is connected to the relief port 140 causing retraction of the main operating pistons 22b, as previously described.

While this occurs the other pair of ratchet motors continue to rotate the bull ring 2, and therefore the valve core 147 continues to rotate until the passage 145 is again aligned between the ports 127 and 128. Liquid under pressure then flows from 127 through 145, and 128 to 130 where it acts on piston 134 to move the valve slide 132 to the right and thereby connecting the pressure inlet 136 through connection 138 to the ratchet motors 22b of the diametrically opposite pair.

Since it is desirable to have a relatively long operating stroke and a quick retracting stroke, the port 146 is angularly spaced from the port 145 only far enough to allow time for the retraction of the piston 22a before the port 145 moves into alignment between port 128 and the pressure inlet port 143. Thus, for example as shown, the power stroke of the main piston 22b may occur over a period equal to about 330° of the rotation of the rotary valve, whereas the retracting action will be completed in the remaining 30° of the rotation.

The operation of the opposite cylinders is shown in Figure 9 as controlled by a separately driven rotary valve identical with 147 but 180° out of phase. In practice, some economy is achieved by merely having additional ports and passages in an extended rotor and cylindrical casing with angular relation such, for example, as is shown between those of the separate valve mechanisms in Figure 9.

If these are, as shown, 180° out of phase, the retraction of the pistons controlled by one valve will occur during the full power stroke of other cylinders controlled by the other valve mechanism; and thus at all times there will be a power stroke operating. If desired with a suitable even number of ratchet motors 18b and a suitable number of valve mechanisms 126, the timing may be set so that one pair of cylinders takes hold precisely at the time another pair drops out of action and a third pair takes hold precisely at the time that the first drops out of action and so on, utilizing the maximum period of the power stroke of each cylinder, but giving a total power flow which remains substantially constant. However, any desired numbers of valves and ratchet motors may be used.

The gear ratio in transmission 122 is, of course, such that the rotor 147 moves from the position in which passage 145 is aligned between 127 and 128 to the position in which passage 146 connects 128 with 143 while the pawl 28 and piston 22b are making a normal power stroke.

Speed control in this type of drive may be by controlling operation of a pump connected through a direct line and manifold to the inlet ports 127, 136, 140, 141 and 148, or by a throttle valve on a line from a pressure reservoir. These conventional units are omitted from the drawings to avoid complication and confusion as their existence and relation will be readily understood by those skilled in the art without such illustration.

As will be apparent also, the proportions of valves, motor cylinders, pistons, etc., are distorted in the diagrammatic showing of Figures 8 and 9, as otherwise these parts would be too small for easy reading of the drawing or the complete drive unit would become too large to show on a single drawing.

What I claim is:

1. A rotational drive for heavy slow moving apparatus which comprises a bull gear, a plurality of groups of reciprocating fluid pressure motors having fluid pressure supply valves operatively associated therewith, said motors being positioned adjacent said gear with the motors of each group arranged in balanced relation about the axis of said gear, means for transmitting force from each motor as a turning moment to said gear, the throw of said motor being so small relative to the radius of the gear that said turning moment remains substantially constant while the fluid pressure supply valves are open, and means including control valves and manifolds for supplying fluid under pressure to said motors, the motors of each group being supplied with fluid pressure from a common source, whereby driving force is distributed simultaneously through the motors of the group to their several parts of the bull gear, and valve timing means controlling operation of said valves so that fluid pressure is supplied successively to the said groups of motors respectively, whereby one group exerts its turning moment on the gear while the motors of another group are in their retractile stroke and thus a substantially continuous turning movement is imparted to said gear.

2. A rotational drive for heavy slow moving apparatus which comprises a bull gear, a plurality of groups of fluid pressure motors having fluid pressure supply valves operatively associated therewith, said motors being positioned adjacent said gear with the motors of each group arranged in balanced relation about the axis of said gear, means for transmitting force from each motor as a turning moment to said gear, the throw of said motor being so small relative to the radius of the gear that said turning moment remains substantially constant while the fluid pressure supply valves are open, means including control valves and manifolds for supplying fluid under pressure to all said motors of said groups respectively, a common source of fluid pressure connected to said manifold for supplying motive force to all the motors of each group, whereby driving force is distributed simultaneously through the motors of the group to their several parts of the bull gear.

ROMAN CHELMINSKI.

REFERENCES CITED

The following references are of record in the file of this patent:

UNITED STATES PATENTS

| Number | Name | Date |
|---|---|---|
| 684,713 | Payton | Oct. 15, 1901 |
| 933,637 | Farrell | Sept. 7, 1909 |
| 1,939,887 | Ferris et al. | Dec. 19, 1933 |
| 1,985,589 | Ter Meer | Dec. 25, 1934 |
| 1,988,749 | Reswick | Jan. 22, 1935 |
| 2,077,744 | Cuno et al. | Apr. 20, 1937 |